(12) United States Patent
Shokri et al.

(10) Patent No.: US 9,431,142 B2
(45) Date of Patent: Aug. 30, 2016

(54) METHODS OF COATING SUBSTRATES WITH ELECTRICALLY CHARGED CONDUCTIVE MATERIALS, ELECTRICALLY CONDUCTIVE COATED SUBSTRATES, AND ASSOCIATED APPARATUSES

(71) Applicant: The Boeing Company, Seal Beach, CA (US)

(72) Inventors: Shahnaz Shokri, Bellevue, WA (US); Quynhgiao N. Le, Bellevue, WA (US); Christopher Broadbent, Kent, WA (US); Alexandra Elena Corona, Cypress, CA (US); Terrell Diane Riley, Cypress, CA (US)

(73) Assignee: The Boeing Company, Chicago, IL (US)

(*) Notice: Subject to any disclaimer, the term of this patent is extended or adjusted under 35 U.S.C. 154(b) by 392 days.

(21) Appl. No.: 14/108,126

(22) Filed: Dec. 16, 2013

(65) Prior Publication Data

US 2014/0106143 A1 Apr. 17, 2014

Related U.S. Application Data

(62) Division of application No. 13/527,795, filed on Jun. 20, 2012, now Pat. No. 8,658,256.

(51) Int. Cl.
*H01B 1/04* (2006.01)
*B05D 1/04* (2006.01)

(52) U.S. Cl.
CPC *H01B 1/04* (2013.01); *B05D 1/04* (2013.01); *B05D 1/045* (2013.01);

(Continued)

(58) Field of Classification Search
CPC .............................................. Y10T 428/24802
See application file for complete search history.

(56) References Cited

U.S. PATENT DOCUMENTS 5,098,771 A 3/1992 Friend
6,986,287 B1 1/2006 Dorfman
(Continued)

FOREIGN PATENT DOCUMENTS

EP 2 282 621 A1 2/2011
WO WO 03/103854 A1 12/2003

OTHER PUBLICATIONS

AuBuchon et al. "Multiple Sharp Bendings of Carbon Nanotubes during Growth to Produce Zigzag Morphology", Nano Lett, 2004, vol. 4, p. 1781-1784.*

(Continued)

*Primary Examiner* — Gerard Higgins
(74) *Attorney, Agent, or Firm* — DASCENZO Intellectual Property Law, P.C.

(57) ABSTRACT

Methods include applying an electric charge to a coating material that includes carbon nanotubes and a carrier, such as paint, and depositing the electrically charged coating material to a substrate. In some methods, the applying includes utilizing an electrostatic sprayer. In some methods, the substrate is isolated from ground during the depositing. In some methods, the substrate is an insulator. Some methods result in regions of carbon nanotubes that are substantially longitudinally aligned after the depositing. Coated substrates may include a coating with carbon nanotubes that are substantially longitudinally aligned and in some examples that are arranged in a zig-zag pattern. Aircraft, spacecraft, land vehicles, marine vehicles, wind turbines, and apparatuses that may be susceptible to lightning strikes or other types of electromagnetic effects and that include a coated substrate also are disclosed.

20 Claims, 6 Drawing Sheets

(52) U.S. Cl.
CPC ...... *B05D 2201/02* (2013.01); *B05D 2203/35* (2013.01); *B05D 2601/20* (2013.01); *Y10T 428/24893* (2015.01); *Y10T 428/249921* (2015.04)

(56) References Cited

U.S. PATENT DOCUMENTS

| | | | |
|---|---|---|---|
| 2004/0043219 A1* | 3/2004 | Ito | B82Y 10/00 428/408 |
| 2005/0230560 A1 | 10/2005 | Glatkowski et al. | |
| 2009/0227162 A1 | 9/2009 | Kruckenberg et al. | |
| 2010/0271253 A1 | 10/2010 | Shah et al. | |
| 2011/0315818 A1 | 12/2011 | Chao et al. | |

OTHER PUBLICATIONS

Hu et al., "Magnetically Responsive Photonic Nanochains," Angew. Chem. Int. Ed. 2011, 50, 3747-3750.

Thostenson et al., "Aligned Multi-Walled Carbon Nanotube-Reinforced Composites: Processing and Mechanical Characterization," J. phys. D., Applied Phys. 35 (2002) L77-L80.

"Basic Electrostatic Spray Finishing," Concept and Theory Training, Form No. 321-028 Aug. 1995, Graco, Inc., Minneapolis, Minnesota (1995).

European search report issued Nov. 6, 2013 for related European Application No. 13169037.2-1353.

* cited by examiner

METHODS OF COATING SUBSTRATES WITH ELECTRICALLY CHARGED CONDUCTIVE MATERIALS, ELECTRICALLY CONDUCTIVE COATED SUBSTRATES, AND ASSOCIATED APPARATUSES

RELATED APPLICATION

The present application is a divisional of and claims priority to U.S. patent application Ser. No. 13/527,795, filed on Jun. 20, 2012 and entitled "METHODS OF COATING SUBSTRATES WITH ELECTRICALLY CHARGED CONDUCTIVE MATERIALS, ELECTRICALLY CONDUCTIVE COATED SUBSTRATES, AND ASSOCIATED APPARATUSES," the complete disclosure of which is incorporated herein by reference.

FIELD

The present disclosure relates to protective coatings.

BACKGROUND

Coatings are applied to substrates for a variety of reasons, including decorative reasons as well as functional reasons. Protection of the underlying substrate (or structure otherwise protected by the underlying substrate) from one or more of wind, ultraviolet light, precipitation, lightning, electrostatic interference, electromagnetic fields, and electromagnetic radiation may be desired, depending on an application of the substrate.

SUMMARY

Methods according to the present disclosure include applying an electric charge to a coating material that includes carbon nanotubes and a carrier, and depositing the electrically charged coating material to a substrate. In some methods, the applying includes spraying the coating material from an electrostatic sprayer. In some methods, the substrate is an insulator. In some methods, the substrate is isolated from ground during the depositing. In some methods, the depositing results in regions of carbon nanotubes that are substantially aligned longitudinally relative to each other. In some methods, the depositing results in regions of carbon nanotubes that are arranged in a zig-zag pattern. In some methods, the depositing includes aligning regions of the carbon nanotubes in a predetermined configuration to create a predetermined conductivity profile of the coated substrate. In some methods, the substrate includes a portion of an aircraft, a spacecraft, a land vehicle, a marine vehicle, a wind turbine, any apparatus fabricated from electrically resistive materials that may be susceptible to lightning strikes or any other types of electromagnetic effects, or any other suitable apparatus.

Coated substrates according to the present disclosure include a substrate and a coating on the substrate that includes carbon nanotubes and a carrier. Some coated substrates include a substrate that is an insulator. Some coated substrates include coatings that have regions of carbon nanotubes that are substantially aligned longitudinally relative to each other. Some coated substrates include coatings that have regions of carbon nanotubes that are arranged in a zig-zag pattern. Some coated substrates include coatings that have carbon nanotubes that define a conductivity profile of the coating. Illustrative, non-exclusive examples of conductivity profiles include profiles that effectuate electrostatic dispersal by the coated substrate. Some coated substrates may define a portion of an aircraft, a spacecraft, a land vehicle, a marine vehicle, a wind turbine, any apparatus fabricated from electrically resistive materials that may be susceptible to lightning strikes or any other types of electromagnetic effects, or any other suitable apparatus.

Aircraft, spacecraft, land vehicles, marine vehicles, wind turbines, apparatuses fabricated from electrically resistive materials that may be susceptible to lightning strikes or any other types of electromagnetic effects, and any other suitable apparatuses also are within the scope of the present disclosure.

DESCRIPTION

Methods of coating substrates, coated substrates, and various apparatuses having coated substrates are disclosed herein.

Figure 1:
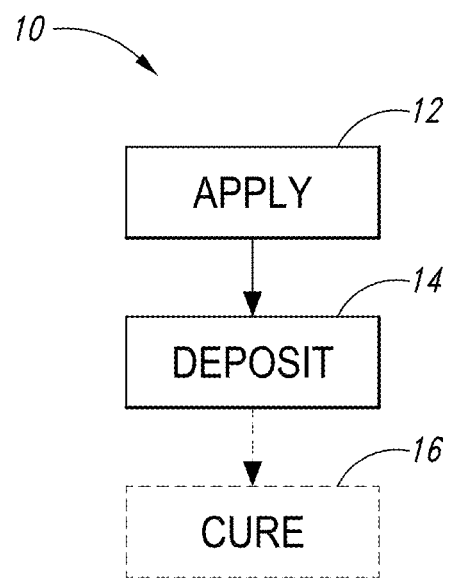
FIG. 1 is a flowchart schematically representing methods according to the present disclosure.
Figure 2:
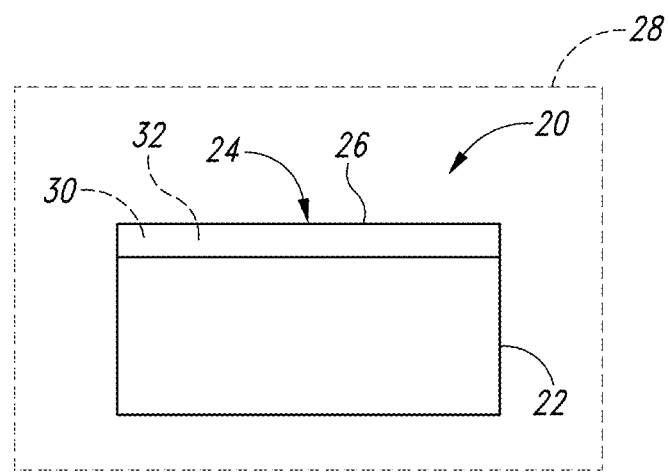
FIG. 2 is a schematic profile view of a coated substrate according to the present disclosure, with the coated substrate optionally defining a portion of an apparatus.

Methods of coating substrates are schematically represented in FIG. 1 and are indicated at 10. FIG. 2 schematically illustrates in profile coated substrates 20 according to the present disclosure that are formed by methods 10. As illustrated in FIG. 2, coated substrates 20 include a substrate 22 and a coating 24 that is defined by a coating material 26. Coated substrates 20 may form a portion of any suitable apparatus 28, illustrative, non-exclusive examples of which include (but are not limited to) aircraft, spacecraft, land vehicle, marine vehicles, and wind turbines. An apparatus 28 may be an apparatus fabricated from electrically resistive materials that is susceptible to lightning strikes or any other electromagnetic effects, such as build-up of electrostatic charges. A coated substrate 20 may define an external surface of an apparatus 28; however, other portions, including internal portions of apparatuses 28, also may be defined by a coated substrate 20. In some embodiments, coating 24 may be described as a protective coating 24, and properties of the coating 24 may be selected to result in a desired function of the coating 24 relative to the substrate 22. For example, desired properties associated with a coating 24 may relate to the electrical resistivity or conductivity of the coating 24, the durability of the coating 24 against weather, such as wind, ultraviolet light, precipitation, and lightning, the transparency of the coating 24, etc.

Figure 3:
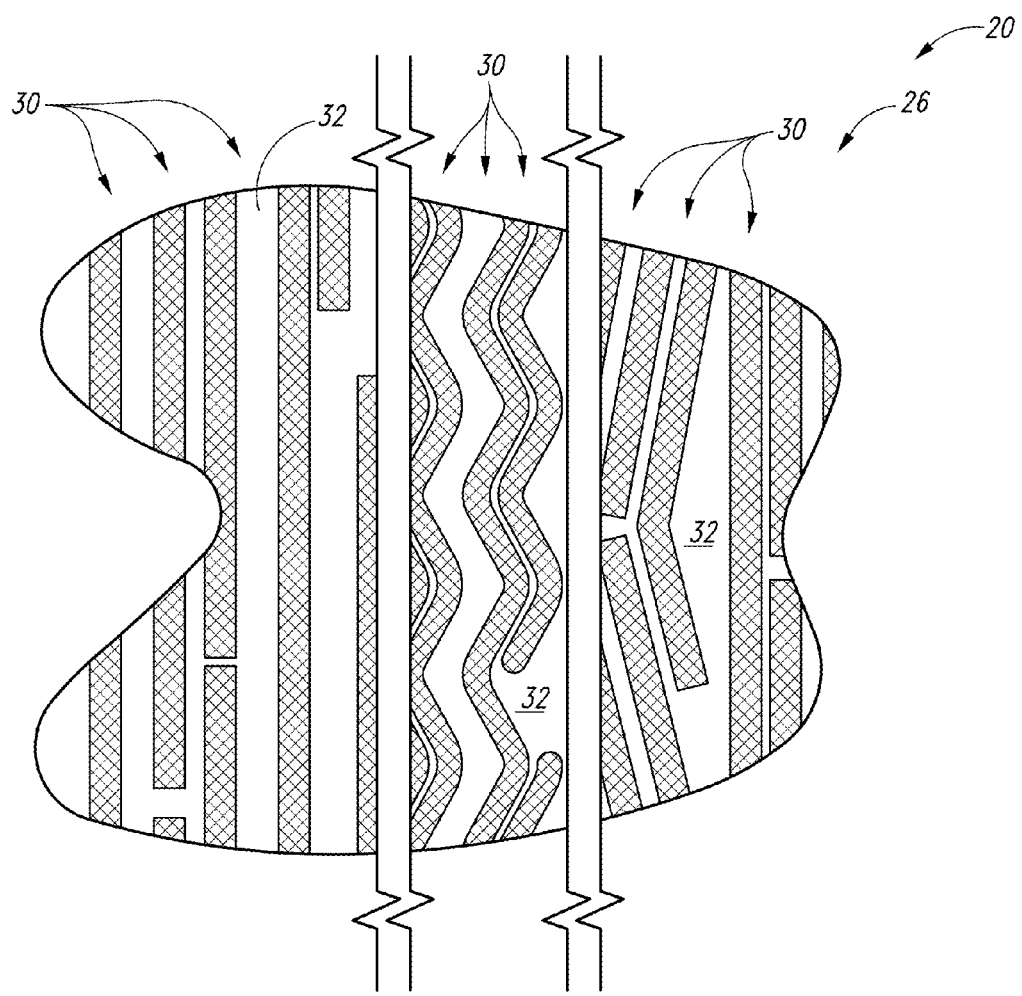
FIG. 3 is a schematic illustration representing coatings according to the present disclosure.

Methods 10 include applying an electrical charge to a coating material 26 to create an electrically charged coating material 26, as indicated at 12 in FIG. 1, and depositing the electrically charged coating material 26 to a substrate 22 to create a coated substrate 20, as indicated at 14 in FIG. 1. As schematically illustrated in FIGS. 2-3, the coating material 26 includes at least carbon nanotubes 30 and a carrier 32. In FIG. 3, the carbon nanotubes 30 are schematically represented by the various sized and oriented structures interspersed amongst the carrier 32; however, neither FIG. 3 nor FIG. 2 are drawn to scale and instead are schematic in nature to facilitate discussion of coated substrates 20.

Any suitable type of carbon nanotubes 30 may be used in a coating material 26 and thus utilized by a method 10, including (but not limited to) single-walled carbon nanotubes, multi-walled carbon nanotubes, double-walled carbon nanotubes, triple-walled carbon nanotubes, nanobuds, graphenated carbon nanotubes, carbon peapods, cup-stacked carbon nanotubes, functionalized nanotubes, filled nanotubes, and/or metal particle decorated nanotubes. When multi-walled carbon nanotubes are used, any suitable number of walls may be present. Illustrative, non-exclusive examples include (but are not limited to) multi-walled carbon nanotubes with 2-10, 2-8, 2-6, 2-4, 4-10, 4-8, 4-6, 6-10, 6-8, and/or 8-10 walls and carbon nanotubes with at least 2, 3, 4, 5, 6, 7, 8, or 10 walls. Other multi-walled carbon nanotubes outside of these enumerated ranges also are within the scope of the present disclosure and may be used in a coating material 26 and thus utilized by a method 10. FIG. 3 schematically represents that a coating material 26 may include more than one type of carbon nanotubes 30 or that a coating material 26 may include only a single type of carbon nanotube 30.

Any suitable size of carbon nanotubes 30 may be used in a coating material 26, including (but not limited to) carbon nanotubes 30 that have outer diameters in the range of 0-18, 0-15, 0-12, 0-9, 0-6, 0-3, 3-18, 3-15, 3-12, 3-9, 3-6, 6-18, 6-15, 6-12, 6-9, 9-18, 9-15, 9-12, 12-18, 12-15, and/or 15-18 nanometers, as well as carbon nanotubes 30 that have outer diameters of at least 1, 3, 6, 9, 12, 15, or 18 nanometers. Any suitable length of carbon nanotubes 30 may be used, including (but not limited to) carbon nanotubes 30 that have lengths of at least 1, 3, 5, 10, 20, 50, or 100 micrometers. Any suitable ratio of length to outer diameter of carbon nanotubes 30 may be used, including (but not limited to) ratios of at least 500, 1,000, 5,000, 10,000, 50,000, 100,000, 500,000, or 1,000,000. Sizes of carbon nanotubes 30 outside of the various enumerated ranges also are within the scope of the present disclosure and may be used in a coating material 26 and thus utilized by a method 10. FIG. 3 schematically illustrates carbon nanotubes 30 of various sizes, schematically representing that a coating material 26 may include carbon nanotubes 30 of more than size; however, it is within the scope of the present disclosure that a coating material 26 may include only or substantially only a single size of carbon nanotubes 30.

Any suitable amount of carbon nanotubes 30 may be used in a coating material 26. As illustrative, non-exclusive examples, the carbon nanotubes 30 may account for 0.1-5, 0.5-5, 1-5, or 3-5 weight percent (wt %) of the coating material 26. Additionally or alternatively, the carbon nanotubes 30 may account for at least 0.1, 0.5, 1, 2, 3, 4, or 5 weight percent of the coating material 26. Additionally or alternatively, the carbon nanotubes 30 may account for less than 0.1, 0.5, 1, 2, 3, 4, or 5 weight percent of the coating material 26. Other ranges of weight percents outside of the enumerate ranges also are within the scope of the present disclosure and may be used for a coating material 26 and thus utilized by a method 10.

Any suitable carrier 32 may be used in a coating material 26 and thus utilized by a method 10. Carrier 32 additionally or alternatively may be referred to as a carrier system 32. Illustrative, non-exclusive examples of carriers 32 include (but are not limited to) resin carriers that include vinylacrylic, vinyl acetate/ethylene, polyurethane, polyester, epoxy, and/or lacquer, as well as pigment, binder, water or other suitable solvent, and/or metallic particles. Additionally or alternatively, some carriers 32 and thus some coating materials 26 may be free of metallic particles. A carrier 32 may be selected for desired properties, such as for protection against weather, for color, for absence of color, etc. A carrier 32 may be transparent, substantially transparent, semi-transparent, or opaque, or when mixed with carbon nanotubes 30 may result in a transparent, substantially transparent, semi-transparent or opaque coating material 26.

Any suitable substrate 22 may be used. For example, in some methods 10, the substrate 22 may be non-conductive, substantially non-conductive, an insulator, or a conductor with an insulated external surface, or coating. The substrate 22 may have a volume resistivity of at least $10^9$, $10^{12}$, $10^{14}$, $10^{16}$, $10^{18}$, or $10^{20}$ Ohm meters at 20 degrees Celsius. Additionally or alternatively, the substrate 22 may have a surface (or sheet) resistivity of at least $10^9$, $10^{12}$, $10^{14}$, $10^{16}$, $10^{18}$, or $10^{20}$ Ohms/square at 20 degrees Celsius. Illustrative, non-exclusive examples of suitable substrates 22 include (but are not limited to) substrates that include glass, a reinforced or non-reinforced plastic having a thermoplastic and/or thermoset polymer.

In some methods 10, during the depositing 14, the substrate 22 is not grounded, is insulated from ground, is isolated from ground, and/or is otherwise isolated from electrically conductive material. Accordingly, during the depositing 14, the charge applied to the coating material 26 will not dissipate upon the coating material 26 contacting the substrate 22. As a result, and as discussed herein, the carbon nanotubes 30 within the coating material 26 will maintain a desired alignment due to the imparted charge during the applying 12. Additionally or alternatively, during the depositing 14, the coating material 26 may not be electrically attracted to the substrate 22. Moreover, depending on the configuration of the carrier 32, the alignment of the carbon nanotubes 30 will be maintained, fixed, or "locked" when the carrier 32 dries, cures, or otherwise solidifies on the substrate 22. Accordingly, a method 10 additionally may be described as including a step of curing 16, as schematically and optionally indicated in FIG. 1 in a dashed box.

The depositing 14 and optional curing 16 of the coating material 26 to define a coating 24 may result in an electrical resistivity that is lower than an electrical resistivity of the substrate 22 without the coating 24. Stated differently, the coated substrate 20 may have a lower surface (or sheet) resistivity than the surface of the substrate 22 without the coating 24. As illustrative, non-exclusive examples, the coating 24, and thus the coated substrate 20, may have a surface (or sheet) resistivity that is less than or equal to 95, 90, 80, 70, 60, 50, 30, 20, 10, 1, 0.1, or 0.01 percent of a surface (or sheet) resistivity of the substrate 22 prior to the depositing 14. Additionally or alternatively, the coated substrate 20 may have a surface (or sheet) resistivity that is less than or equal to 95, 90, 80, 70, 60, 50, 30, 20, 10, 1, 0.1, or 0.01 percent of an electrical (volume) resistivity of the substrate 22 prior to the depositing 14. Additionally or alternatively, illustrative, non-exclusive examples of coated substrates 20 may have a surface (or sheet) resistivity that is less than or equal to $10^9$, $10^8$, $10^7$, $10^6$, $10^5$, $10^4$, $10^3$, $10^2$, 10, or 1 Ohms/square at 20 degrees Celsius. Other values and ranges of electrical resistivity of coated substrates 20 are within the scope of the present disclosure.

In some methods 10, the depositing 14 and optional curing 16 result in subsets or regions of carbon nanotubes 30 that are substantially aligned longitudinally relative to each other, as schematically illustrated in FIG. 3. FIG. 3 also schematically illustrates carbon nanotubes 30 that are positioned at various distances relative to each other. It is within the scope of the present disclosure that the carbon nanotubes 30 are aligned uniformly or at least substantially uniformly; however, it also is within the scope of the present disclosure that the carbon nanotubes 30 are aligned substantially longitudinally, but otherwise are not evenly spaced relative to each other. Moreover, as schematically illustrated in FIG. 3, it is within the scope of the present disclosure, although not required, that some carbon nanotubes 30 may be in contact with each other or at least in close proximity to each other relative to other adjacent carbon nanotubes 30.

By substantially aligned longitudinally relative to each other, it is not meant that the carbon nanotubes 30 are necessarily all parallel or substantially all parallel or that the carbon nanotubes 30 each define a straight axis. Rather, it is meant that the long, or longitudinal, axes of the carbon nanotubes 30 are generally aligned relative to each other, at least within a subset of carbon nanotubes 30. As illustrative, non-exclusive examples, the longitudinal axes of at least 50, 60, 70, 80, or 90 percent of the carbon nanotubes 30 within a region of carbon nanotubes 30 may be within a threshold angle of 10, 8, 6, 4, 2, or 1 degrees relative to each other. Uniformity is not required, and as schematically illustrated in the right portion of FIG. 3, various carbon nanotubes 30 may be angled relative to adjacent carbon nanotubes 30 and still be considered to be substantially aligned longitudinally.

Additionally or alternatively, the depositing 14 may result in subsets or regions of carbon nanotubes 30 that are arranged in a zig-zag pattern. This is schematically illustrated in the middle portion of FIG. 3, schematically representing a single plane of carbon nanotubes 30 within a subset or region of carbon nanotubes 30, with several individual carbon nanotubes 30 defining a zig-zag pattern, and with the several adjacent carbon nanotubes 30 collectively defining a zig-zag pattern. However, this zig-zag pattern may be repeated in three dimensions and is not limited to being present in a single plane of carbon nanotubes 30. As illustrative, non-exclusive examples, the longitudinal axes of the carbon nanotubes 30 within a subset or region may generally angle back and forth within ranges of 90-180, 120-180, and/or 150-180 degrees relative to longitudinally adjacent portions of the longitudinal axes. Other patterns of carbon nanotubes 30 are within the scope of the present disclosure and also may result from the depositing 14 of a method 10.

Additionally or alternatively, the depositing 14 of a method 10 may include aligning subsets or regions of carbon nanotubes 30 in a predetermined configuration relative to the substrate 22 to create a predetermined conductivity profile. As used herein, a "predetermined conductivity profile" refers to any desired and purposefully created configuration of carbon nanotubes 30 within a subset or region of carbon nanotubes 30, such as to achieve a desired electrical effect on the coated substrate 20. Predetermined conductivity profiles may be two dimensional in nature, such as corresponding to a single layer of coating 24, or they may be three dimensional in nature, such as corresponding to more than one layer of coating 24. The aforementioned longitudinally aligned and zig-zag patterns are examples of predetermined configurations; however, any desired and suitable configuration may result from the depositing 14 of a method 10. As an illustrative, non-exclusive example, a predetermined conductivity profile may be configured to effectuate electrostatic dispersal by the coated substrate 20. Additionally or alternatively, a predetermined conductivity profile may be configured to absorb and/or reduce reflection of radar, infrared, and/or sonar signals that are incident on the coated substrate 20. Additionally or alternatively, a predetermined conductivity profile may be configured to disperse electric charges in a predetermined direction, to a predetermined ground or other location, in a substantially two dimensional direction, in three dimensions, and/or to define anisotropic conductivity of the coated substrate 20.

The applying 12 and the depositing 14 of a method 10 may be performed using any suitable device. For example, an electrostatic sprayer (or spray gun) may be used to spray the coating material 26 on to the substrate 22. In such examples, the applying 12 and the depositing 14 may be described as including spraying the coating material 26 from the electrostatic sprayer.

When used, any suitable type and configuration of electrostatic sprayer may be appropriate. For example, the electrostatic sprayer may utilize one or more of corona charging, contact charging, induction charging, frictional charging, direct charging, tribo charging, and/or post-atomization charging to charge the coating material 26. Additionally or alternatively, the electrostatic sprayer may have an operating voltage of 50-150, 50-125, 50-100, 50-75, 75-150, 75-125, 75-100, 100-150, 100-125, or 125-150 kilovolts, an operating voltage of less than 50 kilovolts, or an operating voltage of greater than 150 kilovolts. Additionally or alternatively, the electrostatic sprayer may have a current output of 50-150, 50-125, 50-100, 50-75, 75-150, 75-125, 75-100, 100-150, 100-125, or 125-150 microamps, a current output of less than 50 microamps, or a current output of greater than 150 microamps. Additionally or alternatively, the electrostatic sprayer may spray at a rate of 500-1,500, 500-1,250, 500-1,000, 500-750, 750-1,500, 750-1,250, 750-1,000, 1,000-1,500, 1,000-1,250, or 1,250-1,500 milliliters per minute, at a rate less than 500 milliliters per minute, or at a rate greater than 1,500 milliliters per minute.

EXAMPLE

This example describes an illustrative, non-exclusive example of a utilization of a method 10 resulting in a coated substrate 20. Specifically, a substrate 22 constructed of glass was sprayed with a coating material 26 utilizing an electrostatic sprayer. The glass was not grounded and was otherwise isolated from ground. The coating material 26 included 1.4 weight percent of carbon nanotubes 30. The specific carbon nanotubes 30 used in the coating material 26 were Product Number 724769 from Sigma-Aldrich. According to Sigma-Aldrich, the carbon nanotubes 30 were multi-walled carbon nanotubes with between 3 and 6 walls each, the outer diameters of the carbon nanotubes 30 were in the range of 6-9 nanometers, and the lengths of the carbon nanotubes 30 were 5 micrometers. Moreover, according to Sigma-Aldrich, the mode of the outer diameters of the carbon nanotubes 30 was 5.5 nanometers and the median of the outer diameters of the carbon nanotubes 30 was 6.6 nanometers. The carrier 32 used in the coating material 26 included Aerodur® 3002 polyurethane topcoat from AkzoNobel Aerospace Coatings.

The electrostatic sprayer utilized was a Ransburg® Solo™ electrostatic sprayer, model number 79900. This model of electrostatic sprayer utilizes corona charging to electrically charge the coating material 26, has an operating voltage of 85 kilovolts, has a current output of 130 microamperes max, and sprays at a rate of 1,000 milliliters per minute.

Figure 4:
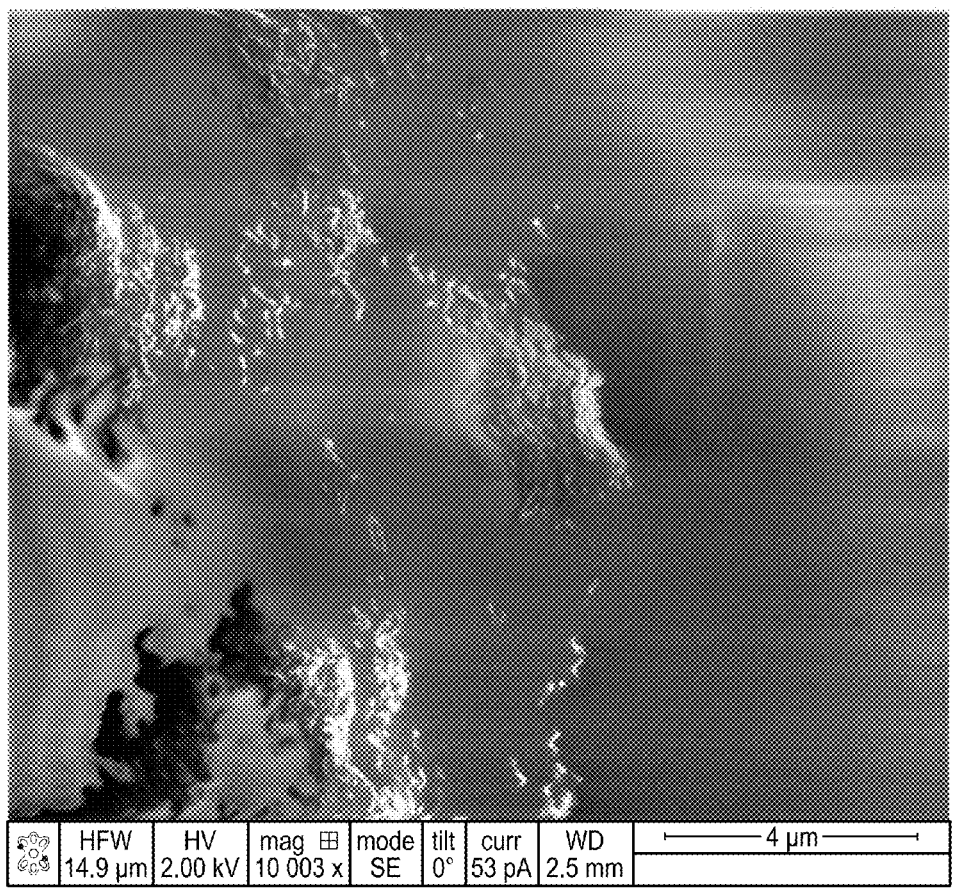
FIG. 4 is an image of a portion of a coating containing carbon nanotubes that was applied to a glass substrate with an electrostatic sprayer, the image taken by a scanning electron microscope at a magnification of 10,000×.
Figure 5:
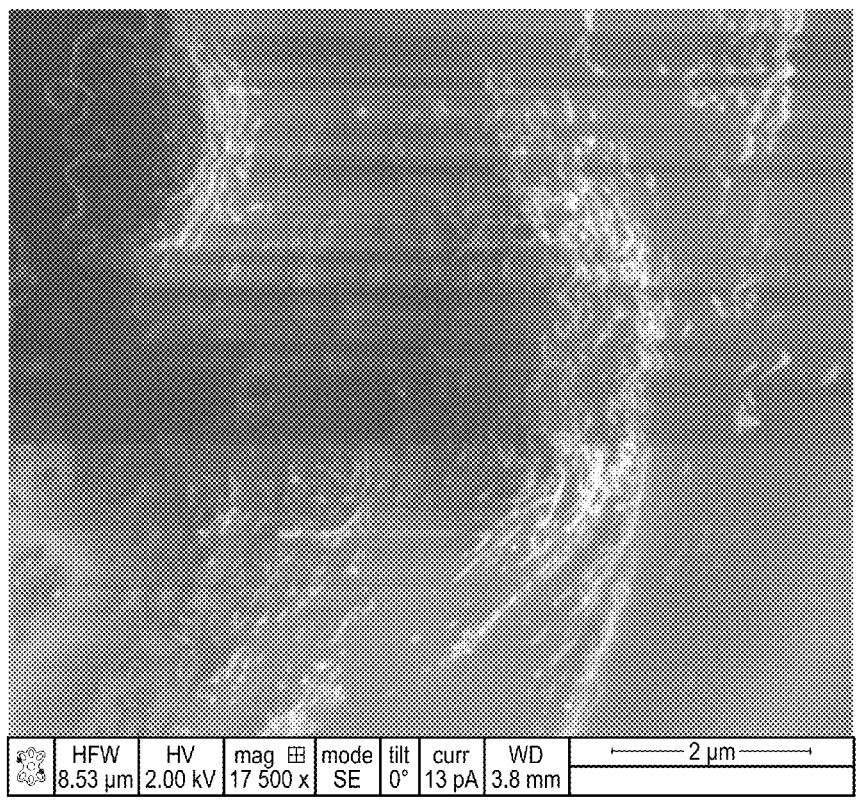
FIG. 5 is an image of a portion of the coating of FIG. 4 taken at a magnification of 17,500×.
Figure 6:
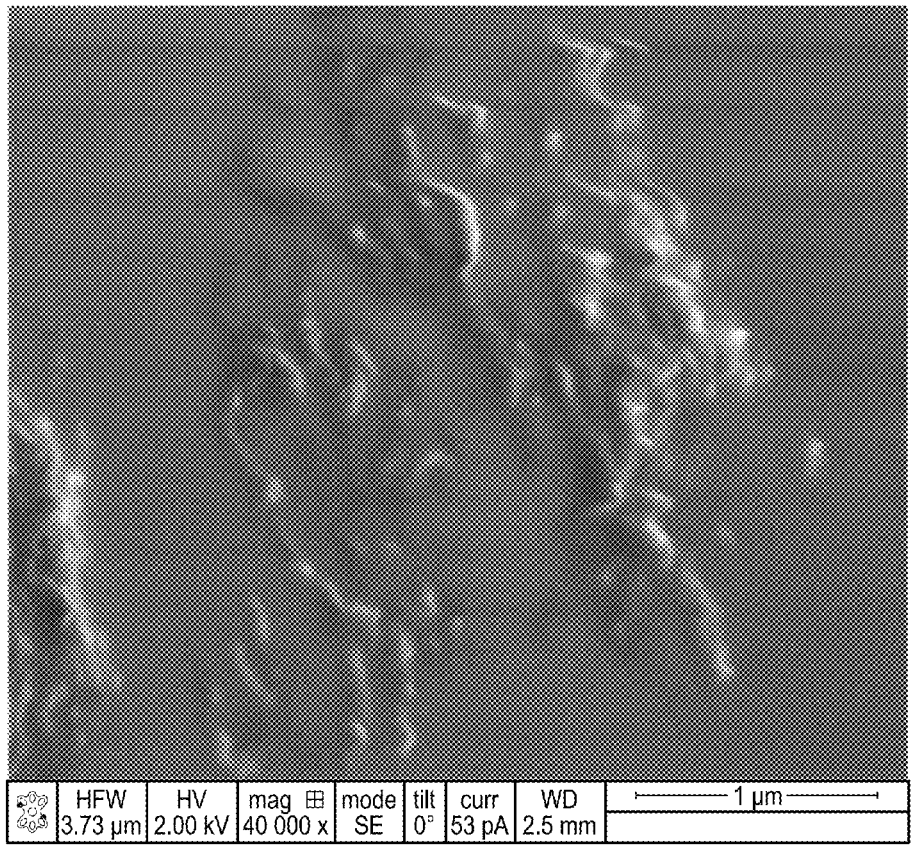
FIG. 6 is an image of a portion of the coating of FIG. 4 taken at a magnification of 40,000×.

FIGS. 4-6 reproduce scanning electron microscope images at magnifications of 10,003×, 17,500×, and 40,000×, respectively, of portions of the coating 24 deposited in this example. As seen in these images, regions of the carbon nanotubes 30 were substantially aligned longitudinally in a zig-zag pattern.

Figure 7:
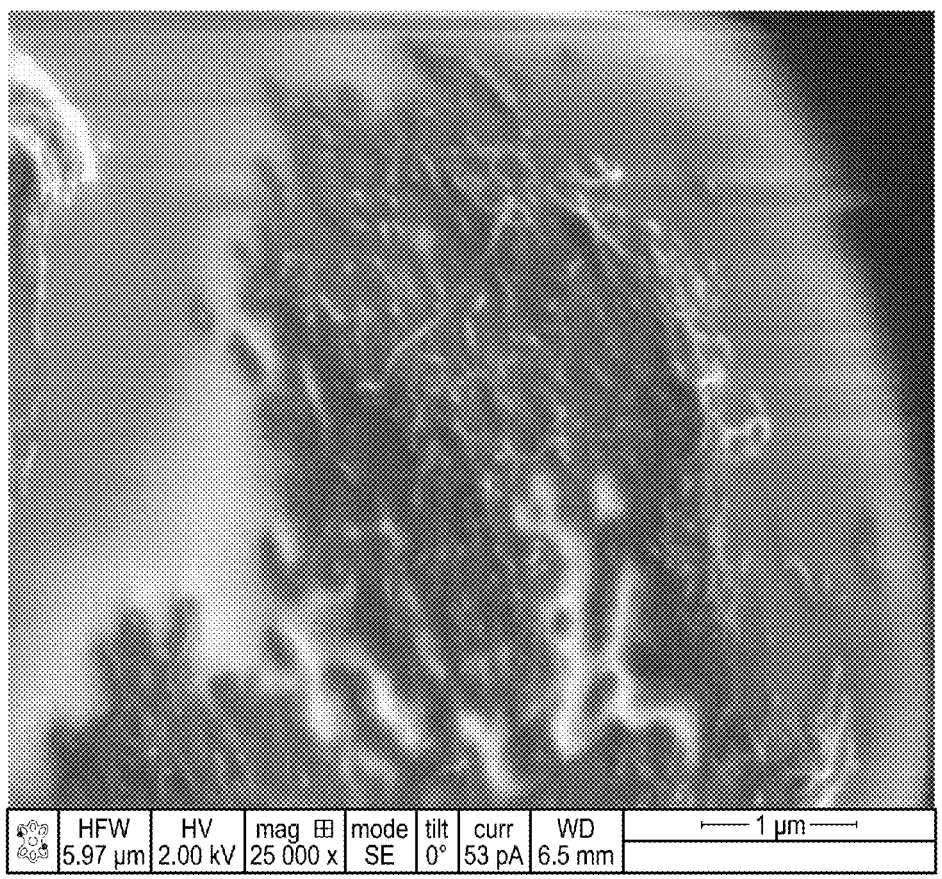
FIG. 7 is an image of a portion of a coating containing carbon nanotubes that was applied to an aluminum substrate with an electrostatic sprayer, the image taken by a scanning electron microscope at a magnification of 25,000×.

As a control, the same coating material 26 that was deposited on the glass substrate 22 discussed above and illustrated in FIGS. 4-6, also was deposited utilizing the same electrostatic sprayer on a grounded aluminum substrate 22. FIG. 7 reproduces a scanning electron microscope image at a magnification of 25,000× of a portion of the coating 24 deposited on the grounded aluminum substrate 22. As seen in this image, the carbon nanotubes 30 were randomly oriented and were not substantially aligned longitudinally, nor were they aligned in a zig-zag pattern.

Illustrative, non-exclusive and non-exhaustive examples of inventive subject matter according to the present disclosure are described in the following enumerated paragraphs:

A A method, comprising:

applying an electric charge to a coating material to create an electrically charged coating material, wherein the coating material includes carbon nanotubes and a carrier; and depositing the electrically charged coating material to a substrate to create a coated substrate.

A1 The method of paragraph A, wherein the applying and the depositing includes spraying the coating material from an electrostatic sprayer.

A1.1 The method of paragraph A1, wherein the electrostatic sprayer utilizes one or more of corona charging, contact charging, induction charging, frictional charging, direct charging, tribo charging, and/or post-atomization charging to charge the coating material.

A1.2 The method of any of paragraphs A-A1.1, wherein the electrostatic sprayer has an operating voltage of 40-150, 40-125, 40-100, 40-85, 75-150, 75-125, 75-100, 100-150, 100-125, or 125-150 kilovolts, an operating voltage of less than 40 kilovolts, an operating voltage greater than 85 kilovolts, or an operating voltage of greater than 150 kilovolts.

A1.3 The method of any of paragraphs A1-A1.2, wherein the electrostatic sprayer has a current output of 50-150, 50-125, 50-100, 50-75, 75-150, 75-125, 75-100, 100-150, 100-125, or 125-150 microamps, a current output of less than 50 microamps, or a current output of greater than 150 microamps.

A1.4 The method of any of paragraphs A-A1.3, wherein the spraying is at a rate of 500-1,500, 500-1,250, 500-1,000, 500-750, 750-1,500, 750-1,250, 750-1,000, 1,000-1,500, 1,000-1,250, or 1,250-1,500 milliliters per minute, a rate less than 500 milliliters per minute, or a rate greater than 1,500 milliliters per minute.

A2 The method of any of paragraphs A-A1.4, wherein the substrate is non-conductive, is substantially non-conductive, is an insulator, is a conductor coated with an insulator, has an electrical (volume) resistivity of at least $10^9$, $10^{12}$, $10^{14}$, $10^{16}$, $10^{18}$, or $10^{20}$ Ohm meters at 20 degrees Celsius, and/or has a surface (or sheet) resistivity of at least $10^9$, $10^{12}$, $10^{14}$, $10^{16}$, $10^{18}$, or 10 Ohms/square at 20 degrees Celsius.

A3 The method of any of paragraphs A-A2, wherein the substrate includes glass, a carbon fiber reinforced polymer, a polymer, a thermoplastic polymer, a polyester, a polyurethane, and/or a plastic.

A4 The method of any of paragraphs A-A3, wherein during the depositing, the substrate is not-grounded, is insulated from ground, is isolated from ground, and/or is isolated from electrically conductive material.

A5 The method of any of paragraphs A-A4, wherein during the depositing, the coating material is not electrically attracted to the substrate.

A6 The method of any of paragraphs A-A5, wherein the carbon nanotubes include single-walled carbon nanotubes, multi-walled carbon nanotubes, double-walled carbon nanotubes, triple-walled carbon nanotubes, nanobuds, graphenated carbon nanotubes, carbon peapods, cup-stacked carbon nanotubes, functionalized nanotubes, filled nanotubes, and/or metal particle decorated nanotubes.

A7 The method of any of paragraphs A-A6, wherein the carbon nanotubes have outer diameters in the range of 0-18, 0-15, 0-12, 0-9, 0-6, 0-3, 3-18, 3-15, 3-12, 3-9, 3-6, 6-18, 6-15, 6-12, 6-9, 9-18, 9-15, 9-12, 12-18, 12-15, and/or 15-18 nanometers, and/or of at least 1, 3, 6, 9, 12, 15, or 18 nanometers.

A8 The method of any of paragraphs A-A7, wherein the carbon nanotubes have lengths of at least 1, 3, 5, 10, 20, 50, or 100 micrometers.

A9 The method of any of paragraphs A-A8, wherein the carbon nanotubes include multi-walled carbon nanotubes with 2-10, 2-8, 2-6, 2-4, 4-10, 4-8, 4-6, 6-10, 6-8, and/or 8-10 walls and/or at least 2, 3, 4, 5, 6, 7, 8, or 10 walls.

A10 The method of any of paragraphs A-A9, wherein the carbon nanotubes have a length to outer diameter ratio of at least 500, 1,000, 5,000, 10,000, 50,000, 100,000, 500,000, or 1,000,000.

A11 The method of any of paragraphs A-A10, wherein the carbon nanotubes are 0.1-5, 0.5-5, 1-5, or 3-5 weight percent of the coating material, are at least 0.1, 0.5, 1, 2, 3, 4, or 5 weight percent of the coating material, and/or are less than 0.1, 0.5, 1, 2, 3, 4, or 5 weight percent of the coating material.

A12 The method of any of paragraphs A-A11, wherein the coated substrate has a surface (or sheet) resistivity that is less than or equal to 95, 90, 80, 70, 60, 50, 30, 20, 10, 1, 0.1, or 0.01 percent of a surface (or sheet) resistivity of the substrate prior to the depositing, and/or a volume resistivity that is less than or equal to 95, 90, 80, 70, 60, 50, 30, 20, 10, 1, 0.1, or 0.01 percent of a volume resistivity of the substrate prior to the depositing.

A12.1 The method of paragraph A12, wherein the coated substrate has a surface (or sheet) resistivity that is less than or equal to $10^9$, $10^8$, $10^7$, $10^6$, $10^5$, $10^4$, $10^3$, $10^2$, 10, or 1 Ohms/square at 20 degrees Celsius.

A13 The method of any of paragraphs A-A12.1, wherein the depositing results in subsets or regions of carbon nanotubes that are substantially aligned longitudinally or parallel relative to each other.

A13.1 The method of paragraph A13, wherein the depositing results in longitudinal axes of at least 50, 60, 70, 80, or 90 percent of the carbon nanotubes within a subset or region that are within a threshold angle of 10, 8, 6, 4, 2, or 1 degrees relative to each other.

A14 The method of any of paragraphs A-A13.1, wherein the depositing results in subsets or regions of carbon nanotubes that are arranged in a zig-zag pattern.

A14.1 The method of paragraph A14, wherein longitudinal axes of the carbon nanotubes within a subset or region angle back and forth within ranges of 90-180, 120-180, and/or or 150-180 degrees relative to longitudinally adjacent portions of the longitudinal axes.

A15 The method of any of paragraphs A-A14.1, wherein the depositing includes aligning subsets or regions of the carbon nanotubes in a substantially longitudinally aligned or parallel configuration.

A16 The method of any of paragraphs A-A15, wherein the depositing includes aligning subsets or regions of the carbon nanotubes in a zig-zag pattern.

A17 The method of any of paragraphs A-A16, wherein the depositing includes aligning subsets or regions of the carbon nanotubes in a predetermined configuration relative to the substrate to create a predetermined conductivity profile of the coated substrate.

A17.1 The method of paragraph A17, wherein the predetermined conductivity profile is configured to effectuate electrostatic dispersal by the coated substrate.

A17.2 The method of any of paragraphs A17-A17.1, wherein the predetermined conductivity profile is configured to absorb and/or reduce reflection of radar, infrared, and/or sonar signals that are incident on the coated substrate.

A17.3 The method of any of paragraphs A17-A17.2, wherein the predetermined conductivity profile is configured to disperse electric charges in a predetermined direction, to a predetermined ground or other location, in a substantially two dimensional direction, and/or to define anisotropic conductivity of the coated substrate.

A18 The method of any of paragraphs A-A17.3, wherein the coating material is opaque, transparent, substantially transparent, and/or semi-transparent after the depositing.

A19 The method of any of paragraphs A-A18, wherein the carrier includes vinyl-acrylic, vinyl acetate/ethylene, polyurethane, polyester, epoxy, lacquer, as well as pigment, binder, water or other suitable solvent, and/or metallic particles.

A20 The method of any of paragraphs A-A19, wherein the coating material is free of metallic particles.

A21 The method of any of paragraphs A-A20, wherein the substrate includes a portion of an aircraft, a spacecraft, a land vehicle, a marine vehicle, a wind turbine, or any apparatus fabricated from electrically resistive materials that may be susceptible to lightning strikes or any other types of electromagnetic effects.

A22 The method of any of paragraphs A-A21, wherein the depositing includes depositing the electrically charged coating to an external surface of an aircraft, a spacecraft, a land vehicle, a marine vehicle, a wind turbine, or any apparatus fabricated from electrically resistive materials that may be susceptible to lightning strikes or any other types of electromagnetic effects.

A23 The method of any of paragraphs A-A22, wherein the depositing includes painting the substrate.

B A coated substrate, comprising:
a substrate; and
a coating on the substrate, wherein the coating includes carbon nanotubes and a carrier.

B1 The coated substrate of paragraph B, wherein the substrate is non-conductive, is substantially non-conductive, is an insulator, has an electrical (volume) resistivity of at least $10^9$, $10^{12}$, $10^{14}$, $10^{16}$, $10^{18}$, or $10^{20}$ Ohm meters at 20 degrees Celsius, and/or has a surface (or sheet) resistivity of at least $10^9$, $10^{12}$, $10^{14}$, $10^{16}$, $10^{18}$, or $10^{20}$ Ohms/square at 20 degrees Celsius.

B2 The coated substrate of any of paragraphs B-B1, wherein the substrate includes glass, a reinforced or non-reinforced plastic having a thermoplastic and/or thermoset polymer.

B3 The coated substrate of any of paragraphs B-B2, wherein the carbon nanotubes include single-walled carbon nanotubes, multi-walled carbon nanotubes, double-walled carbon nanotubes, triple-walled carbon nanotubes, nanobuds, graphenated carbon nanotubes, carbon peapods, cup-stacked carbon nanotubes, functionalized nanotubes, filled nanotubes, and/or metal particle decorated nanotubes.

B4 The coated substrate of any of paragraphs B-B3, wherein the carbon nanotubes have outer diameters in the range of 0-18, 0-15, 0-12, 0-9, 0-6, 0-3, 3-18, 3-15, 3-12, 3-9, 3-6, 6-18, 6-15, 6-12, 6-9, 9-18, 9-15, 9-12, 12-18, 12-15, and/or 15-18 nanometers and/or of at least 1, 3, 6, 9, 12, 15, or 18 nanometers.

B5 The coated substrate of any of paragraphs B-B4, wherein the carbon nanotubes have lengths of at least 1, 3, 5, 10, 20, 50, or 100 micrometers.

B6 The coated substrate of any of paragraphs B-B5, wherein the carbon nanotubes include multi-walled carbon nanotubes with 2-10, 2-8, 2-6, 2-4, 4-10, 4-8, 4-6, 6-10, 6-8, and/or 8-10 walls and/or at least 2, 3, 4, 5, 6, 7, 8, or 10 walls.

B7 The coated substrate of any of paragraphs B-B6, wherein the carbon nanotubes have a length to outer diameter ratio of at least 500, 1,000, 5,000, 10,000, 50,000, 100,000, 500,000, or 1,000,000.

B8 The coated substrate of any of paragraphs B-B7, wherein the carbon nanotubes are 0.1-5, 0.5-5, 1-5, or 3-5 weight percent of the coating and/or are at least 0.1, 0.5, 1, 2, 3, 4, or 5 weight percent of the coating, and/or are less than 0.1, 0.5, 1, 2, 3, 4, or 5 weight percent of the coating.

B9 The coated substrate of any of paragraphs B-B8, wherein the coated substrate has a surface (or sheet) resistivity that is less than or equal to 95, 90, 80, 70, 60, 50, 30, 20, 10, 1, 0.1, or 0.01 percent of a surface (or sheet) resistivity of the substrate prior to the depositing, and/or an electrical (volume) resistivity that is less than or equal to 95, 90, 80, 70, 60, 50, 30, 20, 10, 1, 0.1, or 0.01 percent of an electrical (volume) resistivity of the substrate prior to the depositing.

B9.1 The coated substrate of paragraph B9, wherein the coated substrate has a surface (or sheet) resistivity that is less than or equal to $10^{12}$, $10^{11}$, $10^{10}$, $10^9$, $10^8$, $10^7$, $10^6$, $10^5$, $10^4$, $10^3$, $10^2$, 10, or 1 Ohms at 20 degrees Celsius.

B10 The coated substrate of any of paragraphs B-B9.1, wherein the coating includes subsets or regions of carbon nanotubes that are substantially aligned longitudinally or parallel relative to each other.

B10.1 The coated substrate of paragraph B10, wherein longitudinal axes of at least 50, 60, 70, 80, or 90 percent of the carbon nanotubes within a subsets or region are within a threshold angle of 10, 8, 6, 4, 2, or 1 degrees relative to each other.

B11 The coated substrate of any of paragraphs B-B10.1, wherein the coating includes subsets or regions of the carbon nanotubes arranged in a zig-zag pattern.

B11.1 The coated substrate of paragraph B11, wherein the longitudinal axes of the carbon nanotubes within a subset or region angle back and forth within ranges of 90-180, 120-180, and/or 150-180 degrees relative to longitudinally adjacent portions of the longitudinal axes.

B12 The coated substrate of any of paragraphs B-B11.1, wherein the carbon nanotubes define a conductivity profile of the coating.

B12.1 The coated substrate of paragraph B12, wherein the conductivity profile is configured to effectuate electrostatic dispersal by the coated substrate.

B12.2 The coated substrate of any of paragraphs B12-B12.1, wherein the conductivity profile is configured to absorb and/or reduce reflection of radar, infrared, and/or sonar signals that are incident on the coated substrate.

B12.3 The coated substrate of any of paragraphs B12-B12.2, wherein the conductivity profile is configured to disperse electric charges in a predetermined direction, to a predetermined ground or other location, in a substantially two dimensional direction, and/or to define anisotropic conductivity of the coated substrate.

B13 The coated substrate of any of paragraphs B-B12.3, wherein the coating is opaque, transparent, substantially transparent, and/or semi-transparent.

B14 The coated substrate of any of paragraphs B-B13, wherein the carrier includes vinyl-acrylic, vinyl acetate/ethylene, polyurethane, polyester, epoxy, and/or lacquer, as well as pigment, binder, water or other suitable solvent, and/or metallic particles.

B15 The coated substrate of any of paragraphs B-B14, wherein the coating is free of metallic particles.

B16 An aircraft, comprising:
the coated substrate of any of paragraphs B-B15, and optionally wherein the coated substrate defines a component of the aircraft, and optionally a surface of the aircraft, including an internal surface and/or an external surface of the aircraft.

B17 A spacecraft, comprising:
the coated substrate of any of paragraphs B-B15, and optionally wherein the coated substrate defines a component of the spacecraft, and optionally a surface of the spacecraft, including an internal surface and/or an external surface of the spacecraft.

B18 A land vehicle, comprising:
the coated substrate of any of paragraphs B-B15, and optionally wherein the coated substrate defines a component of the land vehicle, and optionally a surface of the land vehicle, including an internal surface and/or an external surface of the land vehicle.

B19 A marine vehicle, comprising:
the coated substrate of any of paragraphs B-B15, and optionally wherein the coated substrate defines a component of the marine vehicle, and optionally a surface of the marine vehicle, including an internal surface and/or an external surface of the marine vehicle.

B20 A wind turbine, comprising:
the coated substrate of any of paragraphs B-B15, and optionally wherein the coated substrate defines a component of the wind turbine, and optionally a surface of the wind turbine, including an internal surface and/or an external surface of the wind turbine.

B21 An apparatus, comprising:
the coated substrate of any of paragraphs B-B15, and optionally wherein the coated substrate defines a component of the apparatus, and optionally a surface of the apparatus, including an internal surface and/or an external surface of the apparatus, and further optionally wherein the apparatus is susceptible to lightning strikes or other types of electromagnetic effects.

B22 The coated substrate of any of paragraphs B-B15, wherein the coated substrate is formed utilizing the method of any of paragraphs A-A22.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A coated substrate, comprising:
a substrate; and
a coating on the substrate, wherein the coating includes carbon nanotubes and a carrier, wherein the coating includes regions of the carbon nanotubes arranged in a zig-zag pattern, and wherein within the regions, the carbon nanotubes are substantially aligned longitudinally relative to each other.

2. The coated substrate of claim 1, wherein longitudinal axes of at least 50 percent of the carbon nanotubes within the regions are within a threshold angle of 10 degrees relative to each other.

3. The coated substrate of claim 1, wherein longitudinal axes of the carbon nanotubes within the regions angle back and forth within ranges of 90-180 degrees relative to longitudinally adjacent portions of the longitudinal axes.

4. The coated substrate of claim 1, wherein the substrate is substantially non-conductive.

5. The coated substrate of claim 1, wherein the substrate has an electrical volume resistivity of at least 109 Ohm meters at 20 degrees Celsius.

6. The coated substrate of claim 1, wherein the substrate has a surface resistivity of at least 109 Ohms/square at 20 degrees Celsius.

7. The coated substrate of claim 1, wherein the substrate includes glass, a carbon fiber reinforced polymer, a polymer, a thermoplastic polymer, a polyester, a polyurethane, and/or a plastic.

8. The coated substrate of claim 1, wherein the carbon nanotubes have a length to outer diameter ratio of at least 500.

9. The coated substrate of claim 1, wherein the carbon nanotubes are 0.1-5 weight percent of the coating.

10. The coated substrate of claim 1, wherein the coated substrate has a surface resistivity that is less than or equal to 1012 Ohms at 20 degrees Celsius.

11. The coated substrate of claim 1, wherein the carbon nanotubes define a conductivity profile of the coating, and wherein the conductivity profile is configured to effectuate electrostatic dispersal by the coated substrate.

12. The coated substrate of claim 1, wherein the carbon nanotubes define a conductivity profile of the coating, and wherein the conductivity profile is configured to absorb and/or reduce reflection of radar, infrared, and/or sonar signals that are incident on the coated substrate.

13. The coated substrate of claim 1, wherein the carbon nanotubes define a conductivity profile of the coating, and wherein the conductivity profile is configured to define anisotropic conductivity of the coated substrate.

14. The coated substrate of claim 1, wherein the coating is opaque.

15. The coated substrate of claim 1, wherein the coating is semi-transparent.

16. The coated substrate of claim 1, wherein the coating is free of metallic particles.

17. A vehicle, comprising:
the coated substrate of claim 1, wherein the coated substrate defines an external surface of the vehicle, and wherein the vehicle is one of an aircraft, a land vehicle, and a marine vehicle.

18. A wind turbine, comprising:
the coated substrate of claim 1, wherein the coated substrate defines an external surface of the wind turbine.

19. An apparatus, comprising:
the coated substrate of claim 1, and wherein the coated substrate defines an external surface of the apparatus, and further wherein the apparatus is susceptible to lightning strikes or other types of electromagnetic effects.

20. A wind turbine, comprising:
a coated substrate, comprising:
a substrate; and
a coating on the substrate, wherein the coating includes carbon nanotubes and a carrier, and wherein the coating includes regions of the carbon nanotubes arranged in a zig-zag pattern;
wherein the coated substrate defines an external surface of the wind turbine.

* * * * *